US008495080B2

(12) United States Patent
Gao et al.

(10) Patent No.: US 8,495,080 B2
(45) Date of Patent: *Jul. 23, 2013

(54) INITIALIZING A MULTI-TENANT DATABASE

(75) Inventors: Bo Gao, Beijing (CN); Chang Jie Guo, Beijing (CN); Ning Wang, Beijing (CN); Qi Rong Wang, Beijing (CN); Xiao Feng Wang, Beijing (CN); Zhi Hu Wang, Beijing (CN); Zhen Chun Xiao, Beijing (CN); Chun Lin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,855

(22) Filed: Aug. 14, 2012

(65) Prior Publication Data

US 2012/0310965 A1 Dec. 6, 2012

Related U.S. Application Data

(63) Continuation of application No. 13/432,045, filed on Mar. 28, 2012.

(30) Foreign Application Priority Data

Mar. 31, 2011 (CN) .......................... 2011 1 0081103

(51) Int. Cl.
*G06F 17/30* (2006.01)
(52) U.S. Cl.
USPC ............ 707/762; 707/792; 707/803; 707/809
(58) Field of Classification Search
USPC .................................. 707/762, 792, 803, 809
See application file for complete search history.

(56) References Cited

U.S. PATENT DOCUMENTS 7,831,621 B1 * 11/2010 Banks et al. .................. 707/790
2006/0235899 A1 10/2006 Tucker
(Continued)

FOREIGN PATENT DOCUMENTS

EP 2020635 A2 2/2009
WO WO 2007/030796 A3 3/2007

OTHER PUBLICATIONS

Bezemer, C.-P.; Zaidman, A.; Platzbeecker, B.; Hurkmans, T.; 't Hart, A.;, "Enabling multi-tenancy: An industrial experience report," Software Maintenance (ICSM), 2010 IEEE International Conference on, vol., No., pp. 1-8, Sep. 12-18, 2010.

(Continued)

*Primary Examiner* — Shahid Alam
*Assistant Examiner* — Andalib Lodhi
(74) *Attorney, Agent, or Firm* — Vazken Alexanian

(57) ABSTRACT

A method and system for initializing a multi-tenant database. The method includes the steps of: executing a trial of a legacy initialization tool on a trial database; capturing database statements issued by the legacy initialization tool during the step of executing a trial; capturing trial execution results of the database statements; executing the legacy initialization tool on a multi-tenant database; intercepting the database statements issued by the legacy initialization tool during the step of executing the legacy initialization tool on the multi-tenant database; and executing a mock of intercepted database statements corresponding to types of the database statements, types of tables involved in the database statements, and the trial execution results of the database statements, where at least one of the steps is carried out using a computer device.

10 Claims, 5 Drawing Sheets

U.S. PATENT DOCUMENTS

2010/0005443 A1* 1/2010 Kwok et al. ............ 717/100
2011/0010379 A1* 1/2011 Gilderman et al. ........ 707/759

OTHER PUBLICATIONS

W. Zhang, A. Berre, 1st Initial. , "Migrating Legacy Applications to the Service Cloud," Cloud Computing at OOPSLA, Orlando, USA, 2009, vol. , No. , 59-76, 2009.

Xuesong Zhang; Beijun Shen; Xucheng Tang; Wei Chen; , "From isolated tenancy hosted application to multi-tenancy: Toward a systematic migration method for web application," Software Engineering and Service Sciences (ICSESS), 2010 IEEE International Conference on , vol., No., pp. 209-212, Jul. 16-18, 2010.

"Savvis supports isvs migrating to saas," Savvis, vol. , No. , 1-3, 2009.

V. Hazrati, "Making Your Existing Applications Multi-tenant in the Cloud ," Inphina, vol. , No. , pp. 1-7, Aug. 2010. [Web]: http://thoughts.inphina.com/2010/08/23/making-your-existing-applications-multi-tenant-in-the-cloud/.

* cited by examiner

INITIALIZING A MULTI-TENANT DATABASE

CROSS-REFERENCE TO RELATED APPLICATION

This application is a continuation of and claims priority from U.S. application Ser. No. 13/432,045 filed on Mar. 28, 2012, which in turn claims priority under 35 U.S.C. §119 from Chinese Patent Application No. 201110081103.1 filed Mar. 31, 2011, the entire contents of both applications are incorporated herein by reference.

BACKGROUND OF THE INVENTION

1. Field of the Invention

The present invention relates to a multi-tenant application. More particularly, the present invention relates to a method and apparatus for initializing a multi-tenant database.

2. Description of the Related Art

Independent Software Vendors (ISV) seek to deliver their services via the SaaS (Software as a Service) business model and further seek to enable existing legacy single-tenant applications to possess multi-tenant features. For these legacy applications, some automation tools (including initialization applications, scripts, etc.) help to initialize their databases (including schema and data). For example, the following is a code segment of an initialization application:

Create table region(regionId long, regionName varchar (50));
   Insert into region values(100001, 'San Francisco')
   . . . (maybe init app is calculating . . . )
   Create table salesorder(sold long, merchandiseId long, price long, . . . )
   Create table mersalesreport(mdId long, avgprice long)
   . . . (maybe init app is calculating . . . )
   insert into mersalesreport select merchandiseId, avg (price) from salesorder group by merchandiseId
   . . . .

The initializing application first crates a table named region, inserts values into this table, creates a table named salesorder and a table named mersalesreport, and takes relevant data from the table salesorder and inserts into the table mersalesreport after calculation.

Initialization tools for legacy applications are generally not applicable to a multi-tenant database. A common multi-tenant database has three types of tables.

The first table is the Application system table. The Application system table's schema is shared among all tenants, and it stores system data shared by all tenants. The privileges of both creating and modifying table schema and table data belong to an application administrator.

The second table is the Tenant shared table. The Tenant shared table's schema is the same for the tenants, and it stores private data of the respective tenants and uses a special tenant ID column to distinguish between data of different tenants. The privileges of creating and modifying table schema belong to an application administrator, while the privileges of creating and modifying table data belong to the respective tenant administrators.

The third table is the Tenant private table. Tenant private table's schema is private to a tenant, and it stores private data of the tenant. The privileges of creating and modifying table schema and table data belong to the respective tenant administrator.

To enable an existing initialization tool for a legacy application applicable to a multi-tenant database, one method is to modify the code of the existing initialization tool, including the step of taking the tenant ID column of a tenant shared table in the multi-tenant database into consideration. An algorithm for such taking is provided as an example below:

modifying the DML (Data Modification Language) in the existing initialization tool:
   Insert into salesreport select avg (price) from salesorder
   into a new DML:
   Insert into salesreport select avg (price), tid from salesorder group by tid The shortcoming of this method is that large amount of code modification is required, which creates a heavy workload. In addition, the modification is specific to the initialization tool, and thus different modifications are required for different initialization applications. As a result, this method further increases the workload.

SUMMARY OF THE INVENTION

Accordingly, one aspect of the present invention provides a method of initializing a multi-tenant database, the method including the steps of: executing a trial of a legacy initialization tool on a trial database; capturing database statements issued by the legacy initialization tool during the step of executing a trial; capturing trial execution results of the database statements; executing the legacy initialization tool on a multi-tenant database; intercepting the database statements issued by the legacy initialization tool during the step of executing the legacy initialization tool on the multi-tenant database; and executing a mock of intercepted database statements corresponding to types of the database statements, types of tables involved in the database statements, and the trial execution results of the database statements, where at least one of the steps is carried out using a computer device.

Another aspect of the present invention provides an apparatus for initializing a multi-tenant database, the apparatus including: a computer device configured to: execute a trial of a legacy initialization tool on a trial database; capture database statements issued by the legacy initialization tool during the step of executing a trial; capture trial execution results of the database statements; execute the legacy initialization tool on a multi-tenant database; intercept the database statements issued by the legacy initialization tool during the step of executing the legacy initialization tool on the multi-tenant database; and execute a mock of intercepted database statements corresponding to types of the database statements, types of tables involved in the database statements, and the trial execution results of the database statements.

DETAILED DESCRIPTION OF THE PREFERRED EMBODIMENTS

Figure 1:
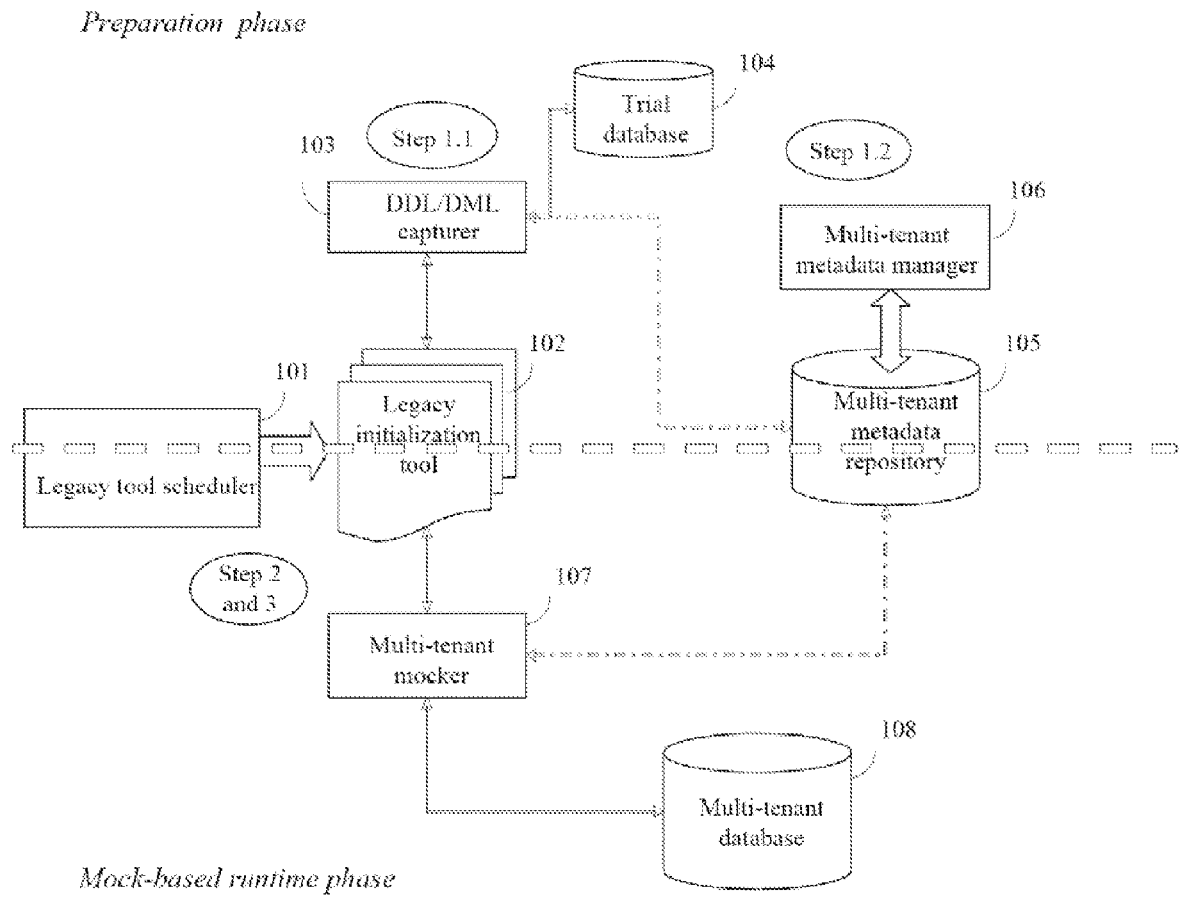
FIG. 1 illustrates the architecture according to an embodiment of the present invention.

Embodiments of the present invention will now be described with reference to the accompanying drawings. In the following description, numerous details are described to enable the present invention to be fully understood. However, it is obvious to those skilled in the art that the realization of the present invention can be without some of these details. In addition, it should be appreciated that the present invention is not limited to the described specific embodiments. In contrast, it is contemplated to implement the present invention by using any combination of the following features and elements, no matter whether they involve different embodiments or not. Therefore, the following aspects, features, embodiments and advantages are only illustrative, rather than elements or limitations of the appended claims, unless explicitly stated otherwise in the claims.

The appended claims set forth the inventive features which are considered characteristic of the present invention. However, the invention itself and its preferred embodiments, additional objects, features and advantages will be better understood by referring to the detailed description of the exemplary embodiments when read in conjunction with the accompanying drawings.

In one aspect of the present invention, there is provided a method of initializing a multi-tenant database, comprising: trial executing a legacy initialization tool on a trial database; capturing the database statements issued by the legacy initialization tool during the trial execution and the trial execution results of the database statements; executing the legacy initialization tool on the multi-tenant database; intercepting the database statements issued by the legacy initialization tool during the execution; mock executing the intercepted database statements according to types of the database statements, the types of tables involved in the database statements and the trial execution results of the database statements, so as to accomplish the initialization of the multi-tenant database.

According to another aspect of the present invention, there is provided an apparatus for initializing a multi-tenant database, comprising: an executing module for trial executing a legacy initialization tool on a trial database; a capturing module for capturing the database statements issued by the legacy initialization tool during the trial execution and the trial execution results of the database statements; the executing module further for executing the legacy initialization tool on the multi-tenant database; an intercepting module for intercepting the database statements issued by the legacy initialization tool during the execution; a mock executing module for mock executing the intercepted database statements according to types of the database statements, the types of tables involved in the database statements and the trial execution results of the database statements, so as to accomplish the initialization of the multi-tenant database.

The technical solution of the present invention realizes the initialization of a multi-tenant database by a legacy initialization tool without modifying the code of the legacy initialization tool. Moreover, the technical solution is not limited a specific legacy tool, instead, it is general and applicable to any legacy tools.

Now referring to FIG. 1, it schematically illustrates the architecture of a technical solution of the present invention. As shown, the technical solution includes two phases: a preparation phase, and a mock-based runtime phase.

1. Preparation Phase

Step 1.1, Capture DDL/DML:

a legacy tool scheduler 101 executes a legacy initialization tool 102 on a trial database 104. The trial database 104 refers to any database specified only for the purpose of capturing DDL/DML statements issued by the legacy initialization tool 102 during execution and corresponding execution results. As described above, the legacy initialization tool 102 refers to an existing automation tool for initializing a database of a legacy application, including an initialization application, a script, etc.

a DDL/DML capturer 103 captures all the DDL/DML statements issued by the legacy initialization tool 102 during execution and corresponding execution results. As known by those skilled in the art, a DDL statement refers to a data definition language statement for creating, canceling and modifying a table structure, and a DML statement refers to a data modification language statement for inserting, modifying or deleting data in a table and for reviewing data.

As known by those skilled in the art, many methods can be employed to implement the DDL/DML capturer 103. For example, a database driver such as ODBC or JDBC can be modified to capture the DDL/DML statements passing through the database driver, so as to implement the DDL/DML capturer 103.

The DDL/DML capturer 103 stores these DDL/DML statements and the execution results in a multi-tenant metadata repository 105.

For example, the captured DDL/DML statements and the execution results can be stored in a table exemplified by the following Table 1.

TABLE 1

Captured DDL/DML statements and the execution results thereof

| ID | DDL/ DML statement | Execution result | Creation time | Application ID |
|---|---|---|---|---|
| 120087 | create table Region (regionid long, name char(20)) | Void | Nov. 11, 2009 | 0562 |
| ... | ... | | | |
| 121003 | create table SalesOrder (soid long, name varchar(20) . . .) | Void | Nov. 11, 2009 | 0562 |
| ... | ... | | ... | ... |

This table lists each captured DDL/DML statement and its execution result, and assigns a unique ID to each DDL/DML statement, and further, optionally the creation time of each DDL/DML statement, and optionally the application ID.

Step 1.2, Maintain the Multi-Tenant Metadata Repository:

Obtain information of the tables included from the DDL statement in the multi-tenant metadata repository 105 through a multi-tenant metadata manager 106.

Identify the types of the tables, i.e., identify whether the table is an application system table, a tenant shared table or a tenant private table, through the multi-tenant metadata manager 106. This can be performed artificially by a user (e.g., the application administrator).

For a tenant private table, modify its table name into a globally unique name through the multi-tenant metadata manager 106. For a tenant shared table, modify its table name so as to be differentiated from the original table name.

The above information such as the types of the tables can be stored in a table exemplified by the following Table 2:

TABLE 2

Types of tables

| Table ID | Table name | DDL statement ID | Table type | Tenant ID | Modified table name | Application ID |
|---|---|---|---|---|---|---|
| 000002 | Region | 120087 | application system | | | 0562 |
| 000003 | Salesorder | 121003 | multi-tenant shared | | Salesorder_MMT | 0562 |
| 000005 | Soext | 121034 | tenant private | T1 | Soext_T1 | 0562 |
| ... | ... | ... | ... | ... | ... | ... |

Table 2 lists the IDs, names, IDs of the corresponding DDL statements, types, tenant IDs (only applicable to tenant private tables), names of the corresponding modified tables (only applicable to tenant share tables and tenant private tables) and optional application IDs of the respective tables included in the captured DDL statements.

As can be known from Table 2, table Region comes from the DDL statement with an ID of 120087 in Table 1, and its type is an application system table; table Salesorder comes from the DDL statement with an ID of 121003 in Table 1, its type is a tenant shared table, and the name of its corresponding modified table is Salesorder_MMT; table Soext comes from the DDL statement with an ID of 121034 in Table 1 (not shown in Table 1), its type is a tenant private table, its corresponding tenant ID is T1, and the name of its corresponding modified table is Soext_T1.

Modify each DDL statement for a tenant shared table from the multi-tenant metadata repository 105 to obtain a modified DDL statement by the multi-tenant metadata manager 106, including replacing the name of the tenant shared table included in the DDL statement with the name of the corresponding modified table, and adding a tenant ID column into the DDL.

In addition, a statement for creating a trigger is formed, the trigger being for setting the current user ID into the tenant ID field of the record in the tenant shared table while inserting the record into the tenant shared table.

In addition, a statement for creating a view is formed, the name of the view being the same as the original name of the tenant shared table, and the view being for obtaining all the records of which the tenant ID is the current user ID from the tenant shared table.

The modified DDL statement, the statement for creating a trigger and the statement for creating a view corresponding to each DDL statement for a tenant shared table from the multi-tenant metadata repository 105 can be stored in a table exemplified by the following Table 3:

TABLE 3

Modified DDL statements

| ID of the modified DDL statement, etc. | Modified DDL statement, etc. | Creation time | DDL statement ID | Application ID |
|---|---|---|---|---|
| 552131 | create table Salesorder_MMT (soid long, name varchar(20), tenantID int) | Nov. 11, 2009 | 121003 | 0562 |
| 552132 | Create trigger TRSalesorder before insert on Salesorder_MMT referencing new As For EACH ROW Set n.tenantID=CURRENT CLIENT_USER_ID | Nov. 11, 2009 | 121003 | 0562 |
| 552133 | Create VIEW Salesorder AS Select soid, name from Salesorder_MMT where tenantID=CURRENT CLIENT_USERID | Nov. 11, 2009 | 121003 | 0562 |

Table 3 lists the IDs of the modified DDL statements (as well as the statements for creating triggers and the statements for creating views), the modified DDL statements (as well as the statements for creating triggers and the statements for creating views), the creation times thereof, the corresponding IDs of the DDL statements for tenant shared tables from the multi-tenant metadata repository, and the application ID.

As shown in Table 3, a modified DDL with an ID of 552131 is created for the DDL statement with an ID of 121003 in Table 1; compared with the DDL, the modified DDL modifies the table name from Salesorder to Salesorder_MMT, and adds a tenantID column into the Salesorder_MMT table. Furthermore, a statement with an ID of 552132 for creating a trigger is formed for the DDL statement, and the trigger is used to set the current user ID, CURRENT CLIENT_USERID, to the tenantID field of a record in the table while inserting the record into the Salesorder_MMT table. In addition, a statement with an ID of 552133 for creating a view is formed for the DDL statement, the name of view being the same as the original name, Salesorder, of the tenant shared table, and the statement is used to select all the records with tenantID as the current user ID from the Salesorder_MMT table, which, as known by those skilled in the art, is realized by the where sub-clause, "where tenantID=CURRENT CLIENT_USERID", in the view creation statement.

2. Mock-Based Runtime Phase

Step 2, initialize the application-level part of the multi-tenant database 108 when the application is on-boarding. The multi-tenant database 108 includes an application-level part and a tenant-level part. The application-level part refers to the part in the multi-tenant database 108 on which the application administrator has privileges to operate, including creating and modifying the schema and data of a application system table, and creating and modifying the schema of a tenant shared table. And the tenant-level part refers to the part in the multi-tenant database 108 on which the respective tenant administrators have privileges to operate, including creating and modifying data of a tenant shared table, and creating and modifying the schema and data of a tenant private table.

Figure 2:
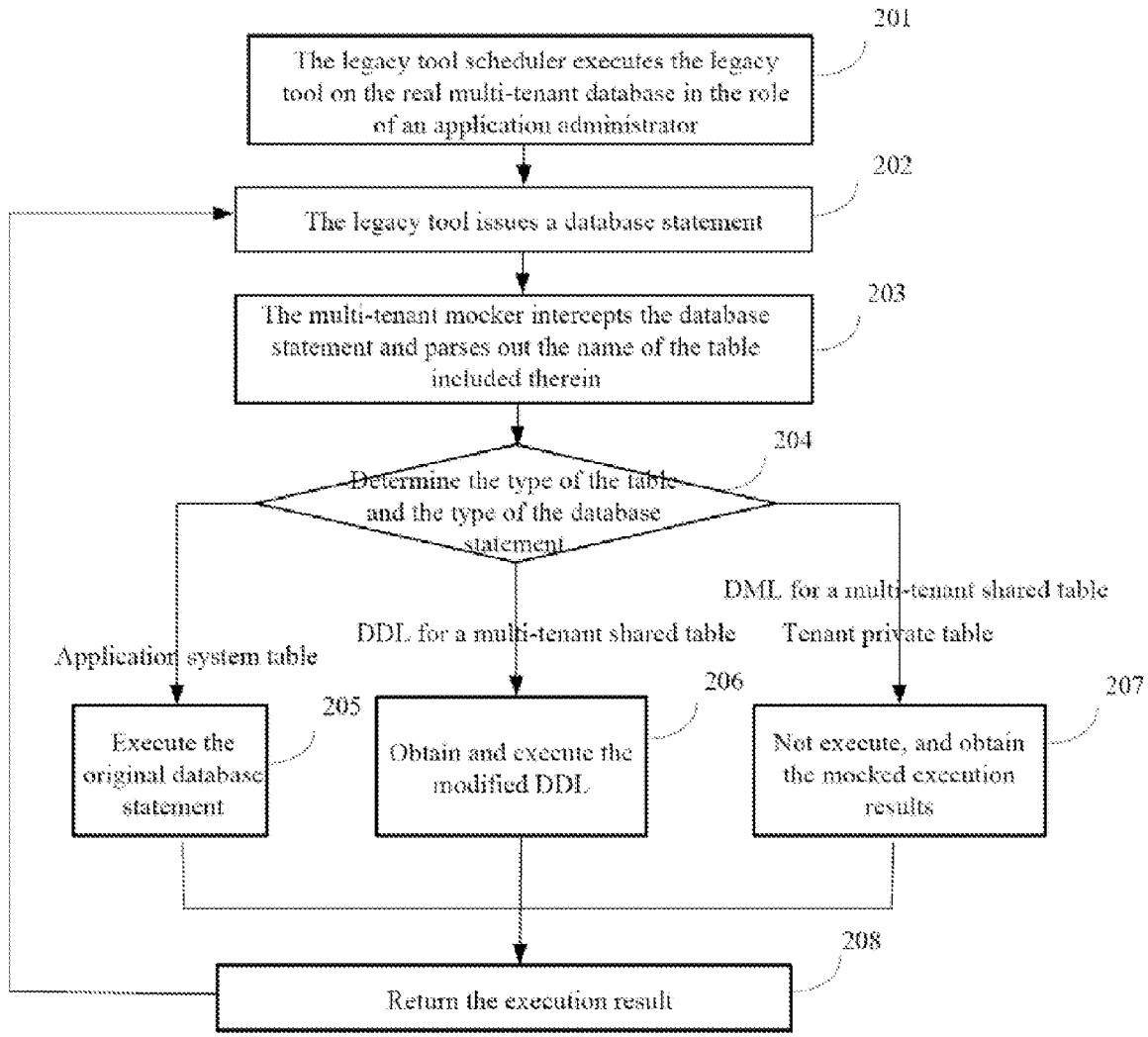
FIG. 2 illustrates an execution process of initializing the application-level part in a multi-tenant database when an application is on-boarding.

Now referring to FIG. 2, it illustrates a concrete execution process of step 2.

As shown in FIG. 2, at sub-step 201, the legacy tool scheduler 101 executes the legacy initialization tool 102 on the real multi-tenant database 108 in the role of an application administrator.

At sub-step 202, the legacy initialization tool 102 issues database statements during the execution. As known by those skilled in the art, database statements are usually SQL statements, which can be divided into DDL statements and DML statements.

At sub-step 203, a multi-tenant mocker 107 intercepts each database statement, and parses out the table name included therein.

At sub-step 204, the multi-tenant mocker 107 determines the type of the table included in the intercepted database statement and the type of the database statement. The multi-tenant mocker 107 can determine whether the type of a parsed-out table name is an application system table, a tenant shared table or a tenant private table by querying the table of types of tables (as exemplified by Table 2) formed and stored in step 1.1 of the above preparation phase. The multi-tenant mocker 107 can determine the type of a database statement, i.e., whether the database statement is a DDL statement or a DML statement, by parsing the intercepted database statement.

If it is determined at sub-step 204 that the table included in the intercepted database statement is an application system table (no matter whether the database statement is a DDL statement or a DML statement), proceed to sub-step 205 to execute the original database statement.

If it is determined at sub-step 204 that the table included in the intercepted database statement is a tenant shared table, and the database statement is a DDL statement, proceed to sub-step 206 to obtain and execute the modified DDL statement corresponding to the DDL statement from the table of modified DDL statements (as exemplified by Table 3) formed and stored in step 1.2 of the above preparation phase, so as to create a tenant shared table including a tenant ID column and with a modified table name in the multi-tenant database 108; obtain and execute the statement for creating a trigger corresponding to the DDL statement, so as to create a trigger on the tenant shared table in the multi-tenant database 108, the trigger being for setting the current user ID into the tenant ID field of a record in the tenant shared table while inserting the record into the tenant shared table; in addition, obtain and execute the statement corresponding to the DDL statement and for creating a view, so as to create a view on the tenant shared table in the multi-tenant database 108, and the view having the same name as the original name of the tenant shared table, and being for obtaining all the records of which the value of the tenant ID is the current user ID from the tenant shared table. Since the view has the same name as the original tenant shared table, the DML operations of query, insertion, modification and deletion, etc., to the tenant shared table in the multi-tenant database 108 issued by the legacy initialization tool and tenant client will actually be executed on the view.

If it is determined at step 205 that the table included in the intercepted database statement is a tenant shared table and the database statement is a DML statement, or the table included in the database statement is a tenant private table (no matter whether the database statement is a DDL statement or a DML statement), proceed to step 207, not executing the database statement and obtaining the mocked execution result. The mocked execution result refers to the execution result obtained while executing the database statement on the above trial database 104, and can be obtained from table of captured DDL/DML statements and the execution results thereof (as exemplified by Table 1) formed and stored in step 1.1 of the above preparation phase.

At sub-step 208, return the execution result. The execution result is the execution result obtained while executing the original database statement at step 205 or executing the modified DDL statement at step 206, or the mocked execution result obtained at step 207.

Then, return to step 202, continue to process other database statements issued by the legacy initialization tool 102 until all the database statements issued by the legacy initialization tool 102 have been processed.

After the execution process of step 2, respective application system tables and data thereof and respective tenant shared tables that are defined by the respective database statements in the legacy initialization tool 102 will be created in the multi-tenant database 108.

The above-described step 2 is executed in the role of an application administrator when an application is on-boarding, and is used to initialize the application-level part in the multi-tenant database 108. If the multi-tenant database 108 only includes the application-level part and does not include the tenant-level part during the initialization, only the above steps 1 and 2 need be executed; if the multi-tenant database 108 additionally includes a tenant-level part besides the application-level part during the initialization, then the following step 3 need to be executed after the above steps 1 and 2 have been executed.

Step 3, when each tenant is on-boarding, initialize the tenant-level part of the multi-tenant database 108. That is to say, this step is performed when each tenant is on-boarding, so that the data of the tenant in the tenant shared table of the multi-tenant database 108 is created, and the schema of the tenant's tenant private table and the data thereof in the multi-tenant database 108 are created as well.

Figure 3:
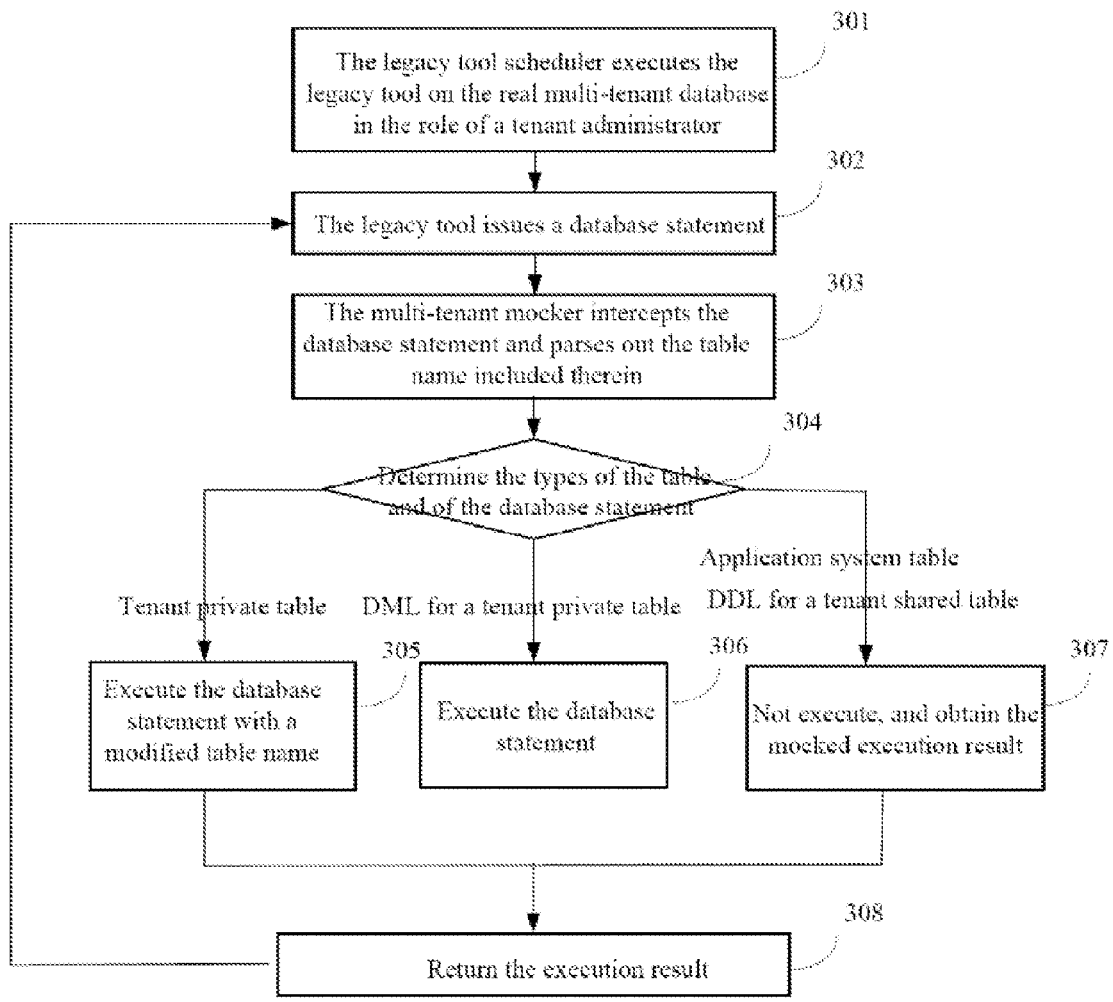
FIG. 3 illustrates an execution process of initializing the tenant-level part in a multi-tenant database when each tenant is on-boarding.

Now referring to FIG. 3, it illustrates the execution process of step 3.

As shown in FIG. 3, at sub-step 301, the legacy tool scheduler 101 executes the legacy initialization tool 102 on the real multi-tenant database 108 in the role of a tenant administrator.

At sub-step 302, the legacy initialization tool 102 issues a database statement during its execution.

At sub-step 303, the multi-tenant mocker 107 intercepts the database statement and parses out the table name included therein.

At sub-step 304, the multi-tenant mocker 107 determines the type of table included in the intercepted database statement and the type of the database statement. The multi-tenant mocker 107 can determine whether the type of the parsed out table name is an application system table, a tenant shared table or a tenant private table by querying the table of types of tables (as exemplified by Table 2) formed and stored in step 1.2 of the above preparation phase. The multi-tenant mocker can determine the type of the database statement, i.e., whether the database statement is a DDL statement or a DML statement, by parsing the intercepted database statement.

If it is determined at sub-step 304 that the type of the table included in the intercepted database statement is a tenant private table (no matter whether the database statement is a DDL statement or a DML statement), then proceed to sub-step 305 to replace the name of the tenant private table in the database statement with a modified globally unique table name, and to execute the database statement in which the table name has been replaced. The modified globally unique table name can be obtained from the table of types of tables (as exemplified by Table 2) that is formed and stored in step 1.2 of the above preparation phase.

If it is determined at sub-step 304 that the type of the table included in the intercepted database statement is a tenant shared table and the database statement is a DML statement, then proceed to sub-step 306 to execute the database statement. Since a view with the same name as the tenant shared table has been created in the multi-tenant database 108 in the above sub-step 206 when the application is on-boarding, the execution of the DML statement on the tenant shared table is actually executed on the view, and the data of the view comes from the tenant shared table. If the DML statement is a DML statement for querying a data in the tenant shared table, since the view includes a where sub-clause that filters out all the records of the current tenant, the execution of the DML statement will obtain all the relevant records of the current tenant from the tenant shared table. If the DML statement is a DML statement for updating data in the tenant shared table, similarly, since the view includes a where sub-clause that filters out all the records of the current tenant, the execution of the DML statement will update the relevant records of the current tenant in the tenant shared table. If the DML statement is a DML statement for deleting data in the tenant shared table, similarly, since the view includes a where sub-clause that filters out all the records of the current tenant, the execution of the DML statement will delete the relevant records of the current tenant in the tenant shared table. If the DML statement is a DML statement for inserting a record into the tenant shared table, since a trigger has been created on the tenant shared table in the above sub-step 206 when the application is on-boarding, the execution of the DML statement will insert the record into the tenant shared table through the view and cause the execution of the trigger, and the execution of the trigger will set the current user ID at the tenant ID field of the record in the tenant shared table.

If it is determined at sub-step 304 that the type of the table included in the intercepted database statement is an application system table (no matter whether the database statement is a DDL statement or a DML statement), or the type of the table included in the database statement is a tenant shared table and the database statement is a DDL statement, then proceed to sub-step 307, not executing the database statement, and obtaining the mocked execution result. The mocked execution result refers to the execution result obtained while executing the database statement on the above trial database 104, and can be obtained from the table of captured DDL/DML statements and the execution results thereof (as exemplified by Table 1) formed and stored in step 1.1 of the above preparation phase.

At sub-step 308, return the execution result. The execution result is the execution result obtained by executing the database statement with the modified table name in sub-step 305, or the execution result obtained by executing the original database statement in step 306, or the mocked execution result obtained at step 307.

Then, return to step 302, continue to process other database statements issued by the legacy initialization tool 102 until all the database statements issued by the legacy initialization tool 102 have been processed.

After the execution of step 3 by the respective tenant administrators, the data of the tenant shared tables and the schemas and data of the respective tenant private tables defined by the database statements in the legacy initialization tool 102 will be created in the multi-tenant database 108.

The technical solution of the present invention realizes the initialization of the multi-tenant database 108 without modifying the code of the legacy initialization tool by intercepting the database statements issued by the legacy tools and mock executing the intercepted database statements on the multi-tenant database 108 in the role of an application administrator and tenant administrators respectively, wherein the mock execution is based on the types of the database statements, the types of tables involved in the database statements and the trial execution results of the database statements. Moreover, the technical solution of the present invention is not limited to a specific legacy tool. Instead, it is general and applicable to any legacy tools.

Above is described the architecture of the technical solution of the present invention by referring to the accompanying drawings, it should be pointed out that, the above description is only exemplary, not limitation to the present invention. To make those skilled in the art better understand and implement the present invention, the above description includes numerous details, while many details therein are not indispensable. Those skilled in the art can learn from the above detailed description of the technical solution of the present invention that, the present invention provides a method of transparently initializing multi-tenant database and an apparatus for transparently initializing multi-tenant database. The following will describe the method and apparatus for transparently initializing multi-tenant database according to embodiments of the present invention by referring to the accompanying drawings respectively. For simplicity, the following description omits part of details repeating the above description, therefore a more detailed understanding of the method and apparatus for transparently initializing multi-tenant database according to embodiments of the present invention can be obtained by referring to the above description.

Figure 4:
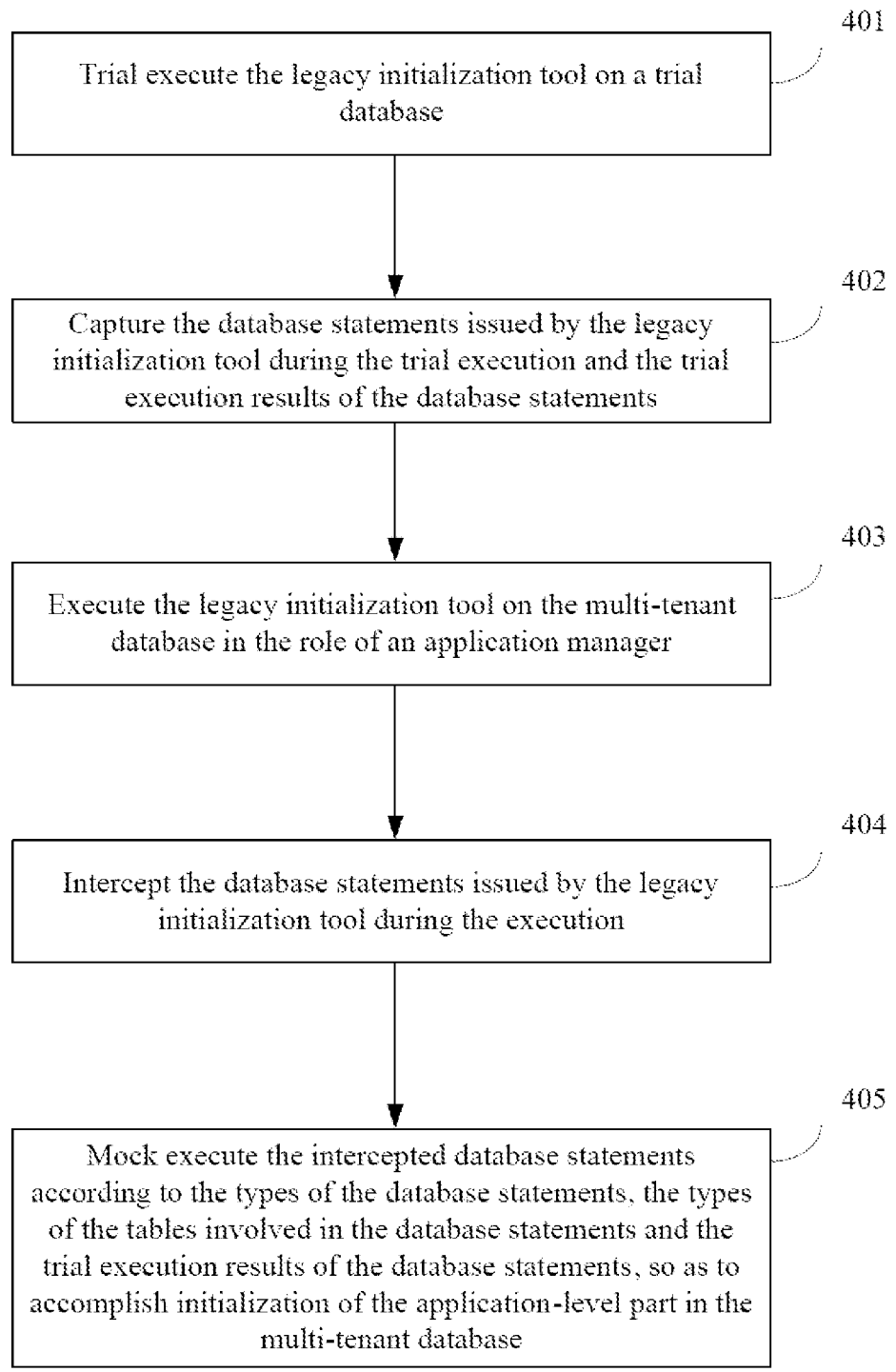
FIG. 4 illustrates a method of transparently initializing a multi-tenant database according to an embodiment of the present invention.

Now referring to FIG. 4, it illustrates a method of transparently initializing multi-tenant database according to an embodiment of the present invention.

As shown, the method comprises the following steps:

At step 401, trial execute a legacy initialization tool on a trial database

At step 402, capture the database statements issued by the legacy initialization tool during the trial execution and the trial execution results of the database statements.

At step 403, execute the legacy initialization tool on the multi-tenant database, which, in an embodiment, can be performed in the role of an application administrator.

At step 404, intercept the database statements issued by the legacy initialization tool during the execution.

At step 405, mock execute the intercepted database statements according to the types of the database statements, the types of tables involved in the database statements and the trial execution results of database statements, so as to accomplish the initialization of the multi-tenant database, which, in one embodiment, is the initialization of the application-level part in the multi-tenant database. As known by those skilled in the art, the initialization of the application-level part in the multi-tenant database includes the creation of the schema and data of the application system tables in the multi-tenant database, and the creation of the schemas of the tenant shared tables.

According to an embodiment of the present invention, the types of database statements include DDL statements and DML statements, and the types of tables include application system tables, tenant shared tables and tenant private tables.

According to an embodiment of the present invention, step 405 comprises the following sub-steps: if an intercepted database statement is a database statement for an application system table, executing the database statement on the multi-tenant database; if an intercepted database statement is a DDL statement for a tenant shared table, obtaining and executing the DDL statement modified by adding a tenant ID column to the tenant shared table; and if an intercepted database statement is a DML statement for a tenant shared table or a database statement for a tenant private table, not executing the database statement, and returning the trial execution result of the database statement to the legacy initialization tool.

According to a further embodiment of the present invention, step 405 further comprises: in response to that an intercepted database statement is a DDL statement for a tenant shared table, obtaining and executing a statement for creating a trigger, which trigger is used to set the current user ID into the tenant ID field of a record in the tenant shared table while inserting the record into the tenant shared table.

According to a further embodiment of the present invention, the modified DDL statement further includes a modified tenant shared table name, and step 405 further comprises: in response to that the intercepted database statement is a DDL statement for a tenant shared table, obtaining and executing a statement for creating a view which has the same name as that of the tenant shared table and is used to obtain all the records of which the tenant ID value is the current user ID in the tenant shared table.

According to an embodiment of the present invention, the method further comprises the following steps: extracting the tables included in the captured database statements during the trial execution of the legacy initialization tool; determining the types of the tables; and storing the tables and the types thereof.

According to a further embodiment of the present invention, the method further comprises the following steps: in response to that an extracted table is a tenant shared table, modifying its name, and storing the modified name in association with the table; and if an extracted table is a tenant private table, modifying its name as a globally unique name, and storing the modified name in association with the table.

According to a further embodiment of the present invention, the method further comprises the following steps: in response to the that a captured database statement is a DDL statement for a tenant shared table, modifying the database statement by adding a tenant ID column to the multi-tenant shared table included in the database statement; and storing the modified database statement in association with the captured database statement.

According to a further embodiment of the present invention, the method further comprises the following steps: in response to that a captured database statement is a DDL statement for a multi-tenant shared table, forming a statement for creating a trigger for setting the current user ID into the tenant ID field of a record in the tenant shared table while inserting the record into the tenant shared table; and storing the statement for creating a trigger in association with the captured database statement.

According to a further embodiment of the present invention, the method further comprises the following steps: in response to that a captured database statement is a DDL statement for a multi-tenant shared table, forming a statement for creating a view having the same name as that of the tenant shared table and being for obtaining all the records of which the tenant ID value is the current user ID in the tenant shared table; and storing the statement for creating a view in association with the captured database statement.

According to an embodiment of the present invention, the method further comprises: executing the legacy initialization tool on the multi-tenant database in the role of a tenant administrator; intercepting the database statements issued by the legacy initialization tool during the execution; mock executing the intercepted database statements according to the types of the database statements, the types of the tables involved in the database statements and the trial execution results of the database statements, so as to accomplish the initialization of the tenant-level part in the multi-tenant database. As known by those skilled in the art, the initialization of the tenant-level part in the multi-tenant database includes the creation of data of the tenant shared tables in the multi-tenant database, and the creation of the schemas and data of the tenant private tables.

According to a further embodiment of the present invention, the step of mock executing the intercepted database statements to accomplish the initialization of the tenant-level part in the multi-tenant database comprises the following sub-steps: if an intercepted database statement is a database statement for a tenant private table, obtaining a corresponding database statement with the tenant private table name modified as a globally unique name, and executing the corresponding database statement on the multi-tenant database; if an intercepted database statement is a DML statement for a tenant shared table, executing the DML statement; and if an intercepted database statement is a database statement for an application system table or a DDL statement for a tenant shared table, not executing the database statement, and returning the trial execution result of the database statement to the legacy initialization tool.

Above has been described a method of transparently initializing multi-tenant database according to embodiments of the present invention by referring to the accompanying drawings, it should be pointed out that, the above description is only exemplary, not limitation to the present invention. In other embodiments of the present invention, the method can have more, less or different steps and the relationship of sequence and inclusion, etc. among the steps can be different from what is described and illustrated.

Figure 5:
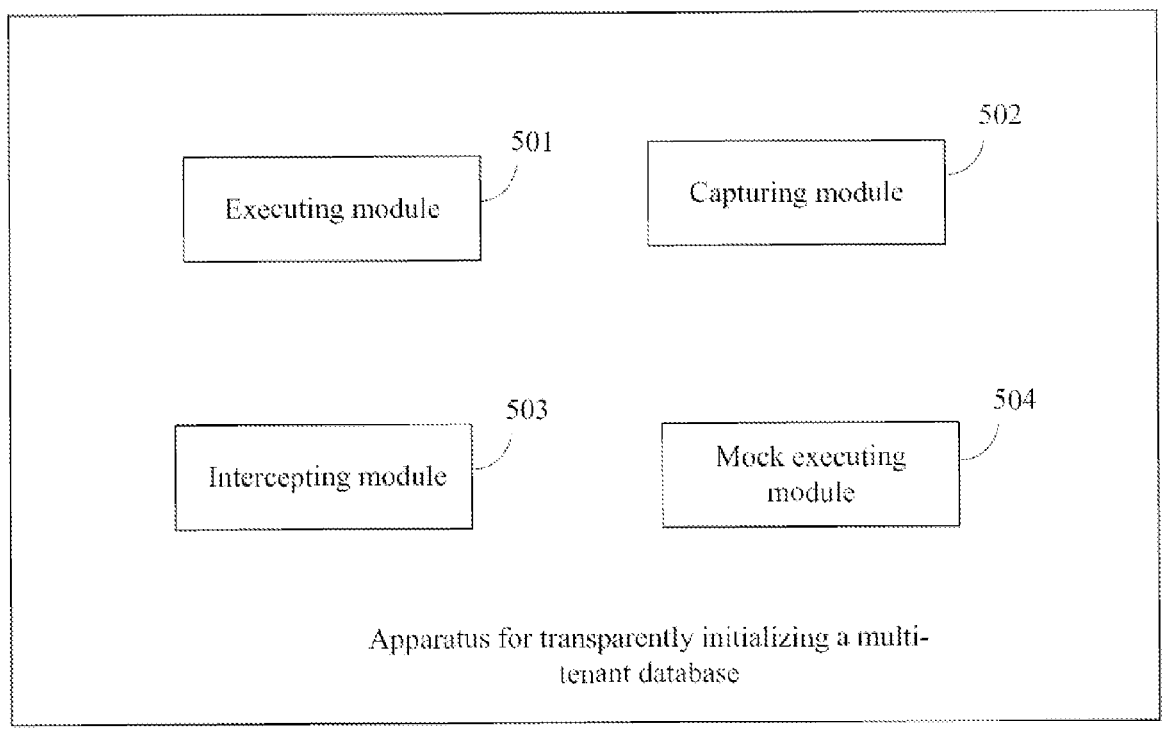
FIG. 5 illustrates an apparatus for transparently initializing a multi-tenant database according to an embodiment of the present invention.

Now referring to FIG. 5, it illustrates an apparatus for transparently initializing multi-tenant database according to an embodiment of the present invention. As shown, the apparatus comprises: an executing module 501 for trial executing a legacy initialization tool on a trial database; a capturing module 502 for capturing the database statements issued by the legacy initialization tool during the trial execution and the trial execution results of the database statements; wherein the executing module 501 further executes the legacy initialization tool on a multi-tenant database, the execution, in one embodiment, being performed in the role of an application administrator; an intercepting module 503 for intercepting the database statements issued by the legacy initialization tool during the execution; a mock executing module 504 for mock executing the intercepted database statements according to the types of the database statements, the types of tables involved in the database statements and the trial execution results of the database statements, so as to accomplish the initialization of the multi-tenant database, which initialization, in one embodiment, is the initialization of the application-level part in the multi-tenant database.

The executing module 501 can be implemented by the legacy tool scheduler 101 shown in FIG. 1. The capturing module 502 can be implemented by the DDL/DML capture 103 shown in FIG. 1. The intercepting module 503 and the mock executing module 504 can be implemented by the multi-tenant mocker 107 shown in FIG. 1. Alternatively, the intercepting module 503 can also be the same module as the capturing module 502.

According to an embodiment of the present invention, the types of database statements include DDL statements and DML statements, and the types of tables include application system tables, tenant shared tables and tenant private tables.

According to an embodiment of the present invention, the mock executing module 504 comprises: means for, if an intercepted database statement is a database statement for an application system table, executing the database statement on the multi-tenant database; means for, if an intercepted database statement is a DDL statement for a tenant shared table, obtaining and executing the DDL statement modified by adding a tenant ID column to the tenant shared table; and means for, if an intercepted database statement is a DML statement for a tenant shared table or a database statement for a tenant private table, not executing the database statement, and returning the trial execution result of the database statement to the legacy initialization tool.

According to a further embodiment of the present invention, the mock executing module 504 further comprises: means for, if an intercepted database statement is a DDL statement for a tenant shared table, obtaining and executing a statement for creating a trigger, the trigger being for setting the current user ID to the tenant ID field of a record in the tenant shared table while inserting the record into the tenant shared table.

According to a further embodiment of the present invention, the modified DDL statement further includes a modified tenant shared table name, and the mock executing module further comprises: means for, if an intercepted database statement is a DDL statement for a tenant shared table, obtaining and executing a statement for creating a view, the view having the same name as that of the tenant shared table and being for obtaining all the records of which the tenant ID value is the current user ID in the tenant shared table.

According to an embodiment of the present invention, the apparatus for transparently initializing multi-tenant database further comprises: an extracting module for extracting tables included in the database statements captured during the trial execution of the legacy initialization tool; a determining module for determining the types of the tables; and a storing module for storing the tables and the types thereof.

The extracting module and the determining module can be implemented by the DDL/DML capturer 103 shown in FIG. 1. The storing module can be implemented by the multi-tenant metadata repository 105 shown in FIG. 1.

According to an embodiment of the present invention, the apparatus for transparently initializing multi-tenant database further comprises: a modifying module for, if the extracted table is a tenant shared table, modifying the table name, and the storing module is further for storing the modified name in association with the table; and the modifying module is further for, if the extracted table is a tenant private table, modifying the table name to be a globally unique name, and the storing module is further for storing the globally unique name in association with the table.

The modifying module can be implemented by the multi-tenant metadata manager 106 shown in FIG. 1.

According to a further embodiment of the present invention, the modifying module is further for: if the captured database statement is a DDL statement for a multi-tenant shared tabled, modifying the database statement by adding a tenant ID column to the multi-tenant shared table included in the database statement; and the storing module is further for: storing the modified database statement in association with the captured database statement.

According to a further embodiment of the present invention, the modifying module is further for: if the captured database statement is a DDL statement for a multi-tenant shared table, forming a statement for creating a trigger, the trigger being for setting the current user ID to the tenant ID field of a record in the tenant shared table while inserting the record into the tenant shared table; and the storing module is further for: storing the statement for creating a trigger in association with the captured database statement.

According to a further embodiment of the present invention, the modifying module is further for: if the captured database statement is a DDL statement for a tenant shared table, forming a statement for creating a view, the view having the same name as that of the tenant shared table and being for obtaining all the records of which the tenant ID value is the current user ID in the tenant shared table; and the storing module is further for: storing the statement for creating views in association with the captured database statement.

According to an embodiment of the present invention, the executing module 501 is further for executing the legacy initialization tool on the multi-tenant database in the role of a tenant administrator; the intercepting module 503 is further for intercepting the database statements issued by the legacy initialization tool during the execution; the mock executing module 504 is further for mock executing the intercepted database statements according to the types of the database statements, the types of tables involved in the database statements and the trial execution results of the database statements, so as to accomplish the initialization of the tenant-level part in the multi-tenant database.

According to a further embodiment of the present invention, the mock executing module 504 comprises: means for, if an intercepted database statement is a database statement for a tenant private table, obtaining a database statement of which the tenant private table name is modified to be a globally unique name and executing the database statement on the multi-tenant database; means for, if an intercepted database statement is a DML statement for a tenant shared table, executing the DML statement; and means for, if an intercepted database statement is a database statement for a application system table or a DDL statement for a tenant shared table, not executing the database statement and returning the trial execution result of the database statement to the legacy initialization tool.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for initializing a multi-tenant database, the apparatus comprising:
   a computer device configured to:
   execute a trial of a legacy initialization tool on a trial database;
   capture database statements issued by said legacy initialization tool during said step of executing a trial;
   capture trial execution results of said database statements; execute said legacy initialization tool on a multi-tenant database; intercept said database statements issued by said legacy initialization tool during said step of executing said legacy initialization tool on said multi-tenant database; and
   execute a mock of intercepted database statements corresponding to types of said database statements comprise DDL (data definition language) statements and DML (data modification language) statements, types of tables involved in said database statements, and said trial execution results of said database statements, wherein executing said mock of said intercepted database statements further comprises:

execute said database statement on said multi-tenant database when said intercepted database statement is a database statement for an application system table;

modify said DDL statement by adding a tenant ID column to said tenant shared table when said intercepted database statement is a DDL statement for a tenant shared table;

obtain a modified DDL statement when said intercepted database statement is said DDL statement for said tenant shared table;

execute said modified DDL statement when said intercepted database statement is said DDL statement for said tenant shared table;

refrain executing said database statement when said intercepted database statement is said DML statement for said tenant shared table or said database statement for a tenant private table; and return a trial execution result of said database statement to said legacy initialization tool.

2. The apparatus according to claim 1, wherein said computer device is further configured to:

execute said legacy initialization tool on said multi-tenant database performs as an application manager; and execute said mock of said intercepted database statements that accomplishes initialization of application-level part in said multi-tenant database.

3. The apparatus according to claim 1, wherein:

said types of said database statements comprise DDL statements and DML statements; and said types of tables comprise application system tables, tenant shared tables and tenant private tables.

4. The apparatus according to claim 1, wherein said computer device is further configured to:

obtain a statement that creates a trigger; set a current user ID into a tenant ID field in a record of said tenant shared table while inserting said record into said tenant shared table when said intercepted database statement is said DDL statement for said tenant shared table; and execute said statement that creates said trigger when said intercepted database statement is said DDL statement for said tenant shared table.

5. The apparatus according to claim 1, wherein:

said modified DDL statement further comprises a modified tenant shared table name; and said computer device configured to execute said mock of said intercepted database statements accomplishes said initialization of application-level part in said multi-tenant database is further configured to:

obtain a statement for creating a view having same name of said tenant shared table and showing all records of which said tenant ID value is said current user ID in said tenant shared table when said intercepted database statement is said DDL statement for said tenant shared table; and execute said statement for creating said view.

6. The apparatus according to claim 1, wherein said computer device is further configured to:

extract tables included in captured database statements during said step of executing a trial of said legacy initialization tool;

determine said types of said tables; and store said tables and said types thereof.

7. The apparatus according to claim 6, wherein said computer device is further configured to:

modify a name of an extracted table in association with a tenant shared table if said extracted table is said tenant shared table;

store modified name in association with said tenant shared table if said extracted table is said tenant shared table;

modify name of said extracted table to a globally unique name if said extracted table is a tenant private table; and store said modified name in association with the tenant private table if said extracted table is said tenant private table.

8. The apparatus according to claim 6, wherein said computer device is further configured to:

modify said database statement by adding a tenant ID column to multi-tenant shared table included in said database statement if said captured database statement is a DDL statement for a multi-tenant shared table; and store modified database statement in association with said captured database statement.

9. The apparatus according to claim 1, wherein said computer device is further configured to:

execute said legacy initialization tool on said multi-tenant database in a role of a tenant administrator;

intercept said database statements issued by said legacy initialization tool during said step of executing said legacy initialization tool on said multi-tenant database in said role of said tenant administrator;

execute said mock of said intercepted database statements corresponding to said types of said database statements, said types of tables involved in said database statements, and said trial execution results of said database statements to accomplish the initialization of a tenant-level part in said multi-tenant database.

10. The apparatus according to claim 9, wherein said computer device is further configured to:

obtain a database statement of which a name of a tenant private table is modified to be a globally unique name if an intercepted database statement is a database statement for a tenant private table;

execute said database statement of which a name of a tenant private table is modified to be a globally unique name on said multi-tenant database;

execute a DML statement if said intercepted database statement is a DML statement for a tenant shared table;

refrain executing said database statement if an intercepted database statement is a database statement for an application system table or said DDL statement for said tenant shared table; and return said trial execution result of said database statement to said legacy initialization tool.

* * * * *